(12) United States Patent
Oketani et al.

(10) Patent No.: US 8,363,615 B2
(45) Date of Patent: *Jan. 29, 2013

(54) MOBILE STATION AND METHOD FOR THE MOBILE STATION

(75) Inventors: Kengo Oketani, Tokyo (JP); Yoshikazu Kakura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/414,530

(22) Filed: Mar. 7, 2012

(65) Prior Publication Data

US 2012/0170538 A1     Jul. 5, 2012

Related U.S. Application Data

(63) Continuation of application No. 11/790,599, filed on Apr. 26, 2007, now Pat. No. 8,165,159.

(30) Foreign Application Priority Data

Apr. 28, 2006    (JP) .................................. 2006/125577

(51) Int. Cl.
*H04W 72/04* (2009.01)
(52) U.S. Cl. ..................................... 370/329; 455/422.1
(58) Field of Classification Search ............... 455/422.1, 455/434; 375/260, 267; 370/208, 260, 329, 370/330, 335, 431, 434
See application file for complete search history.

(56) References Cited

U.S. PATENT DOCUMENTS

| | | | |
|---|---|---|---|
| 7,508,842 B2 * | 3/2009 | Baum et al. ................. | 370/468 |
| 7,539,263 B2 * | 5/2009 | Jung et al. .................... | 375/267 |
| 8,121,105 B2 | 2/2012 | Inoue et al. | |
| 8,165,159 B2 * | 4/2012 | Oketani et al. ................ | 370/468 |
| 2004/0109432 A1 * | 6/2004 | Laroia et al. .................. | 370/343 |
| 2006/0018251 A1 * | 1/2006 | Park et al. ..................... | 370/209 |
| 2006/0028976 A1 * | 2/2006 | Park et al. ..................... | 370/203 |
| 2006/0050799 A1 * | 3/2006 | Hou et al. ...................... | 375/260 |
| 2006/0056528 A1 * | 3/2006 | Jung et al. ..................... | 375/260 |
| 2007/0165588 A1 * | 7/2007 | McCoy ......................... | 370/344 |
| 2009/0147688 A1 | 6/2009 | Matsumoto et al. | |
| 2012/0113931 A1 | 5/2012 | Inoue et al. | |

FOREIGN PATENT DOCUMENTS

| | | |
|---|---|---|
| CN | 1747461 A | 3/2006 |
| EP | 1635481 | 3/2006 |
| KR | 20050099632 | 10/2005 |
| KR | 20060023863 | 3/2006 |
| WO | WO2004/0077728 | 9/2004 |
| WO | WO 2005/015797 | 2/2005 |
| WO | WO 2007-122828 A1 | 11/2007 |
| WO | WO 2007-125910 A1 | 11/2007 |

OTHER PUBLICATIONS

"Physical Layer Aspects for Evolved UTRA" (3GPP TR25.814 v 1.2.2(Mar. 2006), Chapter 9.1).
"Multi-Carrier and Spread Spectrum Systems", K. Fazel and S. Keiser (John Wiley and Sons, 2003).

(Continued)

*Primary Examiner* — Ajit Patel
*Assistant Examiner* — Myron K Wyche
(74) *Attorney, Agent, or Firm* — McGinn IP Law Group, PLLC

(57) ABSTRACT

A mobile station in a wireless communication system including a base station, and a method for the mobile station includes a unit that sends a pilot signal to the base station. A sub-frame used for sending the pilot signal includes a first pilot block and a second pilot block. A first Zadoff-Chu sequence allocated to the first pilot block is different from a second Zadoff-Chu sequence allocated to the second pilot block.

2 Claims, 19 Drawing Sheets

ORIGINAL PILOT SEQUENCE
(NUMBER OF CELLS = K): $\{C\_1, C\_2, C\_3, C\_4, \cdots \cdots , C\_(2K-1), C\_2K\}$

| | CELL #1 | CELL #2 | CELL #3 | CELL #4 | .... | CELL #(K-1) | CELL #K |
|---|---|---|---|---|---|---|---|
| SB #1 | C_1 | C_3 | C_5 | C_7 | .... | C_(2K-3) | C_(2K-1) |
| SB #2 | C_2 | C_4 | C_6 | C_8 | .... | C_(2K-2) | C_2K |

※ALLOCATION OF PILOT SEQUENCE TO EACH CELL AND EACH PILOT BLOCK (SB)

OTHER PUBLICATIONS

European Search Report dated Sep. 28, 2009.
Ericsson: "Uplink reference signals" No. R1-063128, Nov. 6, 2006, pp. 5, XP002494361, TSG-RAN WG1 meeting 47, Riga, Latvia.
NEC Group: "Considerations on uplink pilot design using CAZAC", TSG-RAN WG1 Ad hoc Helsinki, Finland Jan. 23-25, 2006, XP002545599.
Texas Instruments: "On Uplink Pilot in EUTRA SC-FDMA", 3GPP TSG RAN WG1 Ad hoc on LTE, San Diego USA, Oct. 10-14, 2005, XP002545600.
Texas Instruments: "On Uplink Pilot in EUTRA SC-FDMA", 3GPP TSG RAN WG1 Ad hoc on LTE, Oct. 14, 2005, R1-051062, URL: http://www.3gpp.org/ftp/tsg_ran/WG1_RL1/TRGR1_42bis/Docs?R1-051062.zip.
Freescale Semiconductor, Inc., Considerations on SC-FDMA Pilot Design, 3GPP TSG-RAN WG1 Ad hoc on LTE, Jan. 25, 2006, Tdoc R1-060153, URL: http://www.3gpp.org/ftp/tsg_ran/WG1_RL1/TSGR1_AH/LTE_AH_January-06/Docs/R1-060153.zip.
Japanese Office Action dated Jan. 11, 2011 with partial English language translation.
Chinese Office Action dated Sep. 22, 2011 with an English-Language translation thereof.
Korean Office Action dated Jul. 29, 2008 with partial English translation.
Japanese Office Action dated Jul. 17, 2012, with partial English-language translation.
3GPP TSG RAN WG1#44, Denver, Co, Feb. 13-17, 2006, R1-060373: Comparison of Proposed Pilot Structures for SC-OFDMA.
3GPP TSG RAN WG1#44bis, Athens, Greece, Mar. 27-31, 2006, R1-060925: Comparison of Proposed Uplink Pilot Structures for SC-OFDMA.

* cited by examiner

SEVEN CELL REPEATING PATTERN

FIG. 5

ORIGINAL PILOT SEQUENCE
(NUMBER OF CELLS = K): $\{C\_1, C\_2, C\_3, C\_4, \ldots, C\_(2K-1), C\_2K\}$

|      | CELL #1 | CELL #2 | CELL #3 | CELL #4 | ... | CELL #(K-1) | CELL #K |
|------|---------|---------|---------|---------|-----|-------------|---------|
| SB #1 | C_1    | C_3     | C_5     | C_7     | ... | C_(2K-3)    | C_(2K-1)|
| SB #2 | C_2    | C_4     | C_6     | C_8     | ... | C_(2K-2)    | C_2K    |

※ ALLOCATION OF PILOT SEQUENCE TO EACH CELL AND EACH PILOT BLOCK (SB)

FIG. 11

ORIGINAL PILOT SEQUENCE
(NUMBER OF SEQUENCES = K) : {C_1, C_2, C_3, C_4, ........., C_(K-1), C_K}

| | CELL #1 | CELL #2 | CELL #3 | CELL #4 | .... | CELL #(K-1) | CELL #K |
|---|---|---|---|---|---|---|---|
| SB #1 | C_1 | C_2 | C_3 | C_4 | .... | C_(K-1) | C_K |
| SB #2 | C_2 | C_3 | C_4 | C_5 | .... | C_K | C_1 |
| SB #3 | C_3 | C_4 | C_5 | C_6 | .... | C_1 | C_2 |

※ ALLOCATION OF PILOT SEQUENCE TO EACH CELL
   AND EACH PILOT BLOCK (SB)

BLOCK ERROR RATE FOR Eb/No (SIGNAL ENERGY FOR ONE BIT AND NOISE-TO-POWER DENSITY RATIO)

FIG. 15A

IF PILOT SEQUENCES OF SB #1 AND SB #2 ARE NOT CHANGED
TABLE #1

|  | PILOT SEQUENCE ALLOCATION TO EACH SB | |
|---|---|---|
|  | SB#1 | SB#2 |
| SELF-CELL USER | k=1 | k=2 |
| OTHER CELL USER (INTERFERENCE USER) | k=1 | k=2 |

FIG. 15B

IF PILOT SEQUENCES OF SB #1 AND SB #2 ARE CHANGED
TABLE #2

|  | PILOT SEQUENCE ALLOCATION TO EACH SB | |
|---|---|---|
|  | SB#1 | SB#2 |
| SELF-CELL USER | k=1 | k=2 |
| OTHER CELL USER (INTERFERENCE USER) | k=2 | k=3 |

FIG. 15C

IF PILOT SEQUENCES OF SB #1 AND SB #2 ARE CHANGED (OTHER EXAMPLE 1)
TABLE #3

|  | PILOT SEQUENCE ALLOCATION TO EACH SB | |
|---|---|---|
|  | SB#1 | SB#2 |
| SELF-CELL USER | k=1 | k=2 |
| OTHER CELL USER (INTERFERENCE USER) | k=2 | k=1 |

FIG. 16A

IF PILOT SEQUENCES OF SB #1 AND SB #2 ARE CHANGED
(OTHER EXAMPLE 2)

TABLE #4

|  | PILOT SEQUENCE ALLOCATION TO EACH SB | |
|---|---|---|
|  | SB#1 | SB#2 |
| SELF-CELL USER | $k=1$ | $k=3$ |
| OTHER CELL USER (INTERFERENCE USER) | $k=2$ | $k=4$ |

FIG. 16B

IF PILOT SEQUENCES OF SB #1 AND SB #2 ARE CHANGED
(OTHER EXAMPLE 3)

TABLE #5

|  | PILOT SEQUENCE ALLOCATION TO EACH SB | |
|---|---|---|
|  | SB#1 | SB#2 |
| SELF-CELL USER | $k=1$ | $k=1$ |
| OTHER CELL USER (INTERFERENCE USER) | $k=2$ | $k=1$ |

FIG. 16C

IF PILOT SEQUENCES OF SB #1 AND SB #2 ARE CHANGED
(OTHER EXAMPLE 4)

TABLE #6

|  | PILOT SEQUENCE ALLOCATION TO EACH SB | |
|---|---|---|
|  | SB#1 | SB#2 |
| SELF-CELL USER | $k=1$ | $k=1$ |
| OTHER CELL USER (INTERFERENCE USER) | $k=2$ | $k=3$ |

FIG. 17

Simulation Parameters

| Ttansmission Bandwidth | 5 MHz |
|---|---|
| Channel Estimation | Real |
| Modulation | 16QAM |
| sub - frame format | 25.814 v0.5.0 Table 9.1.1-1 '5MHz' case |
| FEC ( forward error correction ) | Rate 1/2 Turbo encoding (TURBO CODE, RATE 1/2) |
| Channel model | TU with 6 paths, type (1) ( from [*] ← REFERENCE IS SHOWN BELOW TABLE ) |
| Doppler rate | 5.56 Hz ( 3 km / h @2.0 GHz ) |
| Number of receive antennas | 2 |
| TTI duration | 0.5ms |
| Transport Block Size ( including CRC ) | 1716 bits |
| Data Multiplexing | Localized FDM |
| Pilot Multiplexing | Distributed - FDM pilot [1] |
| SRF ( Symbol Repetition Factor ) | 4 |

[*] 3GPP TS 45.005 V5.4.0 ( 2002-06 )

FIG. 18

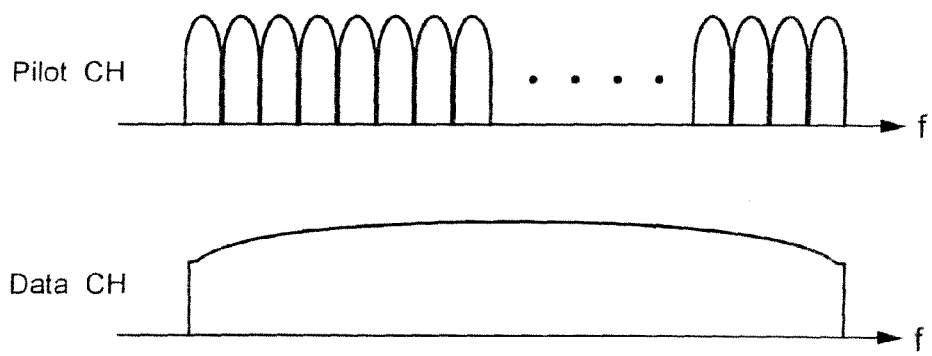

MULTIPLEXING OF Pilot CH AND Data CH
( WHERE FDM pilot AND SRF ( Symbol Repetition Factor = 4 ))

EXAMPLE OF UPLINK WIRELESS FRAME CONFIGURATION

LB #1 TO #6 : SEND DATA SIGNAL
SB #1, #2 : SEND PILOT SIGNAL

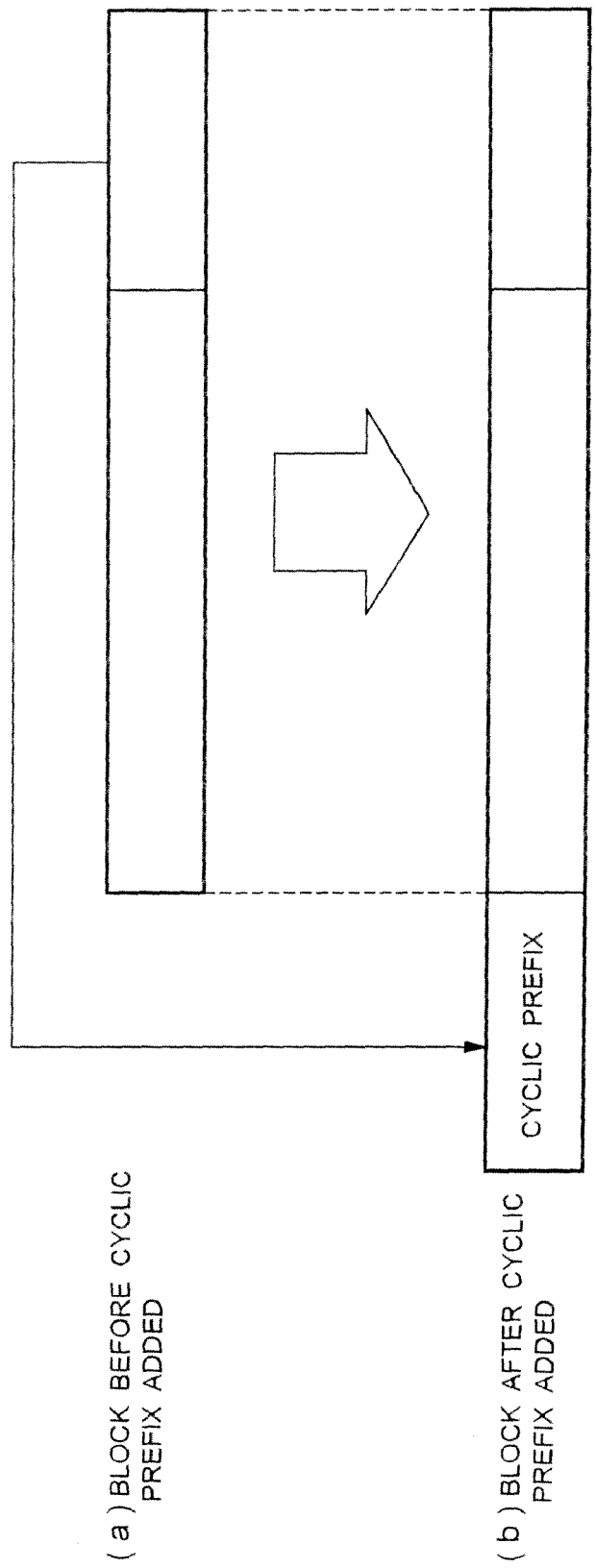

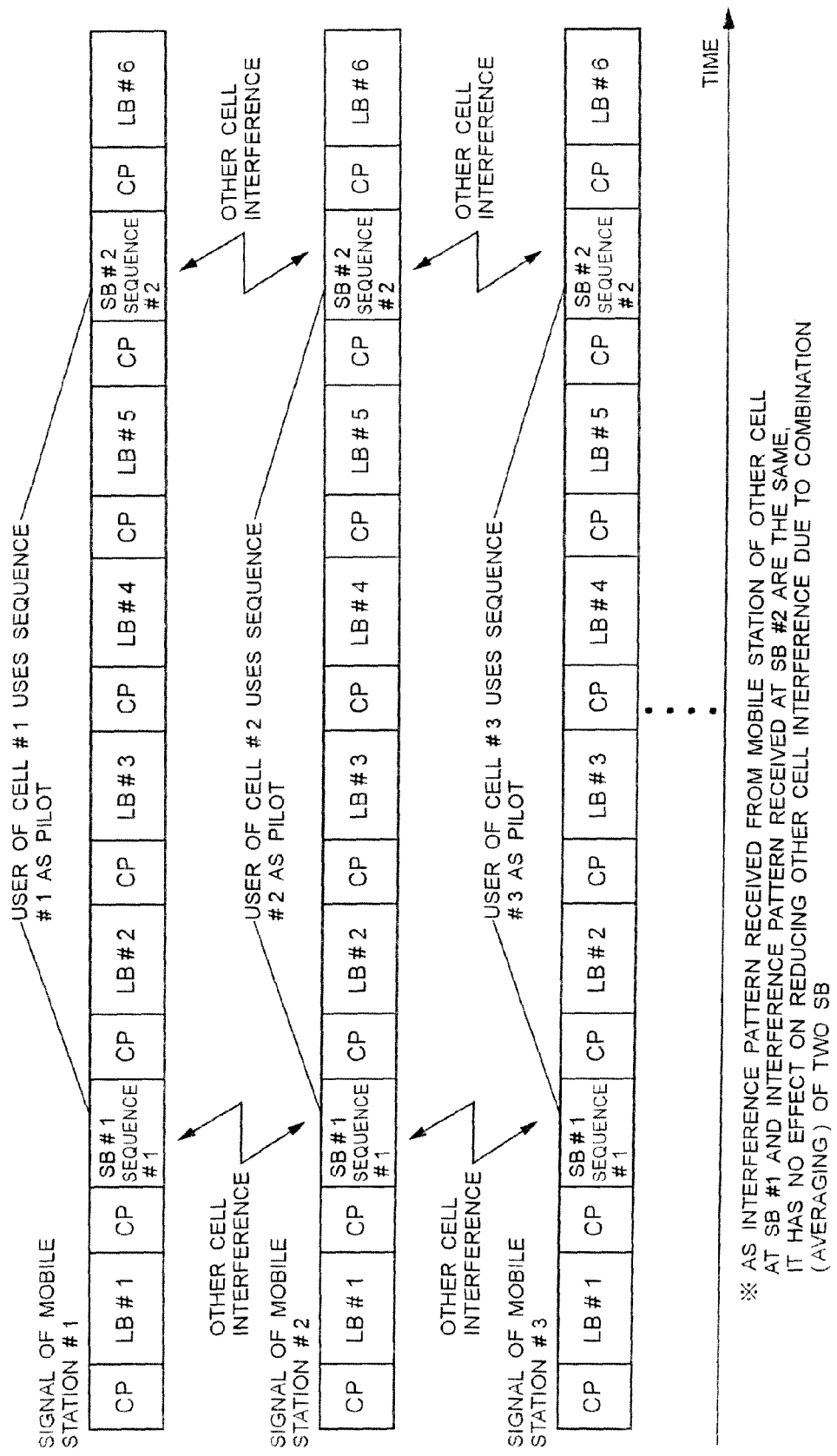

MOBILE STATION AND METHOD FOR THE MOBILE STATION

The present Application is a Continuation Application of U.S. patent application Ser. No. 11/790,599, filed on Apr. 26, 2007 now U.S. Pat. No. 8,165,159, the entirety of which is incorporated herein by reference.

The present application claims priority from Japanese Application No. 2006-125577, the disclosure of which is incorporated herein by reference.

BACKGROUND OF THE INVENTION

1. Field of the Invention

The present invention relates to a wireless communication system, a pilot sequence allocation apparatus and a method for allocating pilot sequence used for the system and the apparatus and a mobile station used in the method, and more specifically to the allocation of pilot sequence in a single carrier transmission system used in a wireless accessing method.

2. Description of the Prior Art

As an uplink wireless accessing method in the wireless communication system of the next generation, a single carrier transmission method is effective (refer to, for example, a Non-Patent document 1, "Physical Layer Aspects for Evolved UTRA" (3GPP TR25.814 v1.2.2 (2006-3), Chapter 9.1.). The configuration of a frame format used in the singe carrier transmission method proposed in the Non-Patent document 1 is shown in FIG. 19.

In FIG. 19, a data signal is supposed to be sent in six LB (Long Block) #1 to #6 in a sub frame and a pilot signal is supposed to be sent in two SB (Short Block) #1, #2.

CP (Cyclic Prefix) is added to the first half of the LB #1 to #6 and SB #1, #2 for effectively executing equalization of frequency regions at the receiving side. Addition of CP is to copy the latter portion of the block to the first portion as shown in FIG. 20.

As a pilot signal used in an uplink wireless accessing in the mobile communication system of the next generation, the Zadoff-Chu sequence, which is one of CAZAC (Constant Amplitude Zero Auto-Correlation) sequences, (refer to, for example, a Non-Patent document 2, K. Fazel and S. Keiser, "Multi-Carrier and Spread Spectrum Systems" (John Willey and Sons, 2003)) is currently drawing attention.

The Zadoff-Chu sequence is represented by the formula:

$$C\_k(n)=\exp[-(j2\pi k/N)(n(n+1/2)+qn)] \quad (1).$$

In the formula (1), n=0, 1, ..., N, and q is an arbitrary integer and N is a sequence length.

The CAZAC sequence is a sequence that has constant amplitude in both regions of time and frequency and it has always Zero Auto-Correlation for time shift that is other than the cyclic self-correlation value is 0. As the CAZAC sequence has Constant amplitude in a time region, it can keep PAPR (Peak to Average Power Ratio) low. As the CAZAC sequence also has Constant amplitude in a frequency region, it is a sequence suitable for propagation path estimation in the frequency region. Here, a small PAPR means that it can keep the power consumption low. This feature is preferred in the mobile communication.

Further, as the "CAZAC sequence" has a complete self-correlating characteristic, it is advantageous in being appropriate for detecting a time of a received signal and draws attention as the pilot sequence appropriate for a single carrier transmission, which is an uplink wireless accessing method in the wireless communication system of the next generation.

In the cellular environment (wireless communication network with a service area divided into a plurality of cells), the base station receives not only an uplink signal of the mobile station in the cell managed by the base station as an uplink received signal but also an uplink signal of the mobile station of the other cell (particularly, adjacent cell) (see FIG. 1). The mobile station receives not only a downlink signal from the base station of the cell managed by the base station but also a downlink signal of the base station of the other cell as it receives the uplink signal. Here, communication from the mobile station to the base station is called an uplink and communication from the base station to the mobile station is called a downlink. The above-mentioned cell can also be called a sector.

As the base station captures a pilot signal from the mobile station in the cell managed by the base station in the uplink communication, the pilot signal sent from the mobile station of the other cell needs to be reduced sufficiently. Thus, it is desirable that a set of small sequences of correlation values is allocated as the pilot sequence of cells adjacent to each other. In the downlink communication, it is also desirable that a set of small sequences of correlation values is allocated as the pilot sequence of cells adjacent to each other for the same reason for the uplink communication.

The correlation characteristic of the CAZAC sequence largely depends on the sequence length. That is to say, if the sequence length includes a prime number or a big prime number, the correlate characteristic is very good (correlation value is small). In contrast, if the sequence length is a combined number comprising only small prime numbers (for example, an exponent such as 2 or 3), the correlate characteristic greatly degrades (a big value is included in the correlation value).

Specifically, if the sequence length of Zadoff-Chu sequence is a prime number, the correlation value of arbitrary sequences is always kept $1/\sqrt{N}$ (N is a sequence length and the root is a prime number) (for example, refer to the Non-Patent document 2). If the sequence length: N=127, the correlation value is always kept $1/\sqrt{127}$, and if the sequence length: N=128, the worst value (the maximal value) of the correlation value is $1/\sqrt{2}$.

Sequences whose correlation value is $1/\sqrt{N}$ are abundant by the number of (N−1). From the viewpoint of a correlation value, it is proposed that the CAZAC sequence whose sequence length is the same primary number and whose parameter [parameter in the formula (1)] is different is allocated to each cell as a pilot sequence. As a result of that allocation, the number of sequences are (N−1), thus, the same pilot sequence needs to be re-performed for each of the (N−1) cells. The (N−1) will be called as the number of repeating of the pilot sequences below.

On the other hand, if the pilot sequence is sent in a plurality of blocks (two SB #1, #2 in the frame format shown in FIG. 19) as in the frame format of an uplink wireless access considered in the wireless communication system of the next generation (see FIG. 19) and if a pilot sequence is allocated for each cell as mentioned above (that is to say, if sent pilot sequence is common in a plurality of pilot blocks in a frame and the pilot sequences used in SB #1, #2 of the frame format shown in FIG. 19 are the same), an interference pattern from the other cell are the same in each pilot block at the receiving side.

That causes a problem in that no effect of reduction of interference by other cells by combining (averaging) a plurality of pilot blocks can be obtained at the receiving side. This is because no effect of reduction of interference by other cells can be obtained; as the pilot sequences sent in a plurality of pilot blocks are the same, interference from the other cells are received in the same manner (interference pattern) in every pilot block to combine (average) them (see FIG. 21).

If a pilot sequence common in a plurality of pilot blocks in a frame is used in a conventional W-CDMA (Wideband-Code Division Multiple Access) and the like, a sequence which is a random sequence multiplied for a frame called a scrambling code is sent. Thus, a pattern of the pilot sequence to be sent differs for each pilot block so that the effect of reduction of interference by other cells can be obtained by combining (averaging) a plurality of pilot blocks at the receiving side.

In the abovementioned conventional uplink wireless accessing system, if a sequence such as the abovementioned CAZAC sequence is used as a pilot sequence, it is limited that a scrambling code cannot be applied to. This is because that a unique characteristic is lost [for example, CAZAC characteristic (a characteristic advantageous for receiving such as constant amplitude in a time and frequency regions, and the cyclical self-correlation value is always 0 except for the case where the time shift is 0)], as a result of multiplying a sequence such as the CAZAC sequence by a random sequence such as a scrambling code.

If a sequence such as the CAZAC sequence is used as a pilot sequence and only a code is allocated for each cell, the problem in that the effect of reduction of interference cannot be obtained by combining (averaging) received pilot blocks in the abovementioned frame cannot be avoided.

The object of the present invention is to provide a wireless communication system, a pilot sequence allocation apparatus and a method for allocating pilot sequence to be used in the apparatus and a mobile station using the method that eliminates the abovementioned problems and can obtain the effect of reduction of interference by combining received pilot blocks if a sequence such as the CAZAC sequence is used as a pilot sequence.

BRIEF SUMMARY OF THE INVENTION

The first wireless communication system of the present invention is a wireless communication system including a plurality of cells, a pilot sequence allocation apparatus for allocating a pilot sequence used in communication between a base station and a mobile station to each cell, and the mobile station, comprising:

central processing unit provided in the pilot sequence allocation apparatus, of allocating different pilot sequence to each of a plurality of pilot blocks in a frame for one of the plurality of cells, and central processing unit provided in the mobile station, of allocating the different pilot sequence to each of a plurality of pilot blocks in a frame for said base station.

The second wireless communication system of the present invention is that at least one of a plurality of pilot sequences allocated to one of the plurality of cells is different from at least one of a plurality of pilot sequences allocated to a different cell.

The third wireless communication system of the present invention is that the pilot sequence allocation apparatus divides the pilot sequence into sets of the number of pilot blocks in the frame and allocates the set to each of the plurality of cells.

The fourth wireless communication system of the present invention includes N (N is an integer of 2 or more) pilot blocks in the frame, and wherein the pilot sequence allocation apparatus performs allocation of the pilot sequence so that the pilot sequence is reused by the number of repeating cells M (M is an integer of 2 or more) and the pilot sequences to be allocated to $j^{th}$ pilot block (j=1, 2, ..., N) of the cell i (i=1, 2, ..., M) are different for different cells.

The fifth wireless communication system of the present invention is that the pilot sequence allocation apparatus performs allocation of the pilot sequence so that a pilot sequence to be allocated to $j^{th}$ pilot block of the cell i and a pilot sequence to be allocated to $j'^{th}$ pilot block of the cell i (j'≠j) are different.

The sixth wireless communication system of the present invention is that the pilot sequence allocation apparatus makes a pilot sequence allocated to the $j^{th}$ pilot block of the cell i a candidate for the sequence to be allocated to $j'^{th}$ (j'≠j) pilot block of the other cell i' (i'≠i) again.

The seventh wireless communication system of the present invention is that the pilot sequence allocation apparatus allocates the sequence $C\_(\{i+j-2\}) \mod M\}+1)$ to the $j^{th}$ pilot block of the cell i so that the total number of the pilot sequence $C\_(1), C\_(2), \ldots, C\_(M)$ is equal to the number of repeating cells M and the number of pilot blocks in one frame N is at the number of repeating cells M or less (N≦M).

The eighth wireless communication system of the present invention is that the pilot sequence is the CAZAC (Constant Amplitude Zero Auto-Correlation) sequence.

The ninth wireless communication system of the present invention is that a sequence length of the pilot sequence is a primary number length.

The first pilot sequence allocation apparatus of the present invention is a pilot sequence allocation apparatus for allocating a pilot sequence used in communication between a base station and a mobile station for each of a plurality of cells of the wireless communication system, comprising:

central processing unit of allocating a pilot sequence different for each of a plurality of pilot blocks in a frame for one of the plurality of cells.

The second pilot sequence allocation apparatus of the present invention is that at least one of a plurality of pilot sequences allocated to one of the plurality of cells is different from at least one of a plurality of pilot sequences allocated to a different cell.

The third pilot sequence allocation apparatus of the present invention is that it divides the pilot sequence into sets of the number of pilot blocks in the frame and allocates the set to each of the plurality of cells.

The fourth pilot sequence allocation apparatus of the present invention allocates the pilot sequence so that the pilot sequence to be allocated to the $j^{th}$ pilot block (j=1, 2, ..., N) of the cell i (i=1, 2, ..., M) and a pilot sequence to be allocated to the $j^{th}$ pilot block of the other cell are different from each other in a frame configuration including N (N is an integer of 2 or more) pilot blocks is included in a frame, when the pilot sequence is reused by the number of repeating cells M (M is an integer of 2 or more).

The fifth pilot sequence allocation apparatus of the present invention performs allocation of the pilot sequence so that a pilot sequence to be allocated to $j^{th}$ pilot block of the cell i and a pilot sequence to be allocated to $j'^{th}$ pilot block of the cell i (j'≠j) are different.

The sixth pilot sequence allocation apparatus of the present invention makes a pilot sequence allocated to the $j^{th}$ pilot block of the cell i a candidate for the sequence to be allocated to $j'^{th}$ (j'≠j) pilot block of the other cell i' (i'≠i) again.

The seventh pilot sequence allocation apparatus of the present invention allocates the sequence $C\_(\{i+j-2\}) \mod M\}+1)$ to the $j^{th}$ pilot block of the cell i so that the total number of the pilot sequence $C\_(1), C\_(2), \ldots, C\_(M)$ is equal to the number of repeating cells M and the number of pilot blocks in one frame N is at the number of repeating cells M or less (N≦M).

The eighth pilot sequence allocation apparatus of the present invention is that the pilot sequence is the CAZAC (Constant Amplitude Zero Auto-Correlation) sequence.

The ninth pilot sequence allocation apparatus of the present invention is that a sequence length of the pilot sequence is a primary number length.

The first method for allocating a pilot sequence of the present invention is a method for allocating a pilot sequence used in a wireless communication system including a plurality of cells, a pilot sequence allocation apparatus for locating a pilot sequence used in communication between a base station and a mobile station to each cell, and the mobile station, comprising in the pilot sequence allocation apparatus:

allocating different pilot sequence to each of a plurality of pilot blocks in a frame for one of said plurality of cells.

The second method for allocating a pilot sequence of the present invention is that at least one of a plurality of pilot sequences allocated to one of the plurality of cells is different from at least one of a plurality of pilot sequences allocated to a different cell.

The third method for allocating a pilot sequence of the present invention is that the pilot sequence allocation apparatus divides the pilot sequence into sets of the number of pilot blocks in the one frame and allocates the set to each of the plurality of cells.

The fourth method for allocating a pilot sequence of the present invention includes N (N is an integer of 2 or more) pilot blocks in the frame, and wherein the pilot sequence allocation apparatus performs allocation of the pilot sequence so that the pilot sequence allocation apparatus reuses the pilot sequence by the number of repeating cells M (M is an integer of 2 or more) and the pilot sequences to be allocated to $j^{th}$ pilot block ($j=1, 2, \ldots, N$) of the cell i ($i=1, 2, \ldots, M$) are different for different cells.

The fifth method for allocating a pilot sequence of the present invention is that the pilot sequence allocation apparatus performs allocation of the pilot sequence so that a pilot sequence to be allocated to $j^{th}$ pilot block of the cell i and a pilot sequence to be allocated to $j'^{th}$ pilot block the cell i ($j' \neq j$) are different.

The sixth method for allocating a pilot sequence of the present invention is that the pilot sequence allocation apparatus makes a pilot sequence allocated to the $j^{th}$ pilot block of the cell i a candidate for the sequence to be allocated to $j'^{th}$ ($j' \neq j$) pilot block of the other cell i' ($i' \neq i$) again.

The seventh method for allocating a pilot sequence of the present invention is that the pilot sequence allocation apparatus allocates the sequence $C\_(\{i+j-2\} \mod M)+1)$ to the $j^{th}$ pilot block of the cell i so that the total number of the pilot sequence $C\_(1), C\_(2), \ldots, C\_(M)$ is equal to the number of repeating cells M and the number of pilot blocks in the one frame N is at the number of repeating cells M or less (N≦M).

The eighth method for allocating a pilot sequence of the present invention is that the pilot sequence is the CAZAC (Constant Amplitude Zero Auto-Correlation) sequence.

The ninth method for allocating a pilot sequence the present invention is that a sequence length of the pilot sequence is a primary number length.

The first mobile station of the present invention is a mobile station for communicating with a base station of a wireless communication system, comprising:

central processing unit of sending a signal that allocates a different pilot sequence to each of a plurality of pilot blocks in a frame for the base station.

The second mobile station of the present invention is that the central processing unit decides a pilot sequence to be allocated to the plurality of pilot blocks based on an index of the pilot sequence received from the base station.

The third mobile station of the present invention is at least one of pilot sequences allocated to one of the plurality of pilot blocks is different from at least one of a plurality of pilot sequences allocated to the mobile station of a different cell.

The recording medium of the present invention is a recording medium that records a program of a method for allocating a pilot sequence used in wireless communication system including a plurality of cells, a pilot sequence allocation apparatus for allocating a pilot sequence used in communication between a base station and a mobile station to each cell, and the mobile station, wherein the recording medium is provided in the pilot sequence allocation apparatus and records a program for causing a computer to execute allocating different pilot sequence to each of a plurality of pilot blocks in a frame for the plurality of cells.

According to the present invention, significant effect of reduction of interference can be obtained by combining received pilot blocks when the abovementioned configurations and operations are used and a sequence such as the CAZAC sequence is used as a pilot sequence.

BRIEF DESCRIPTION OF THE DRAWINGS

FIG. 5 a diagram showing a configuration of an allocation correspondence table showing a pilot sequence allocation by the first embodiment of the present invention;

FIG. 11 is a diagram showing a configuration of an allocation correspondence table showing allocation of pilot sequence by the fourth embodiment of the present invention;

FIG. 15A to 15C are diagrams showing allocation examples of pilot sequence to the pilot blocks (SB #1, SB #2) used in simulation in the present invention;

FIG. 16A to 16C are diagrams showing allocation examples of pilot sequence to the pilot blocks (SB #1, SB #2) used in simulation in the present invention;

FIG. 17 is a diagram showing exemplary parameters used in a simulation relating to the present invention;

FIG. 18 is a diagram showing a case where a data signal and a pilot signal are multiplexed in a frequency region of a simulation in the present invention;

FIG. 20 is a diagram for illustrating addition of a cyclic prefix; and

FIG. 21 is a diagram for illustrating problems caused by conventional allocation of pilot sequence.

DETAILED DESCRIPTION OF THE PREFERRED EMBODIMENTS

Now, embodiments of the present invention will be described with reference to drawings.

[Embodiment 1]

Figure 1:
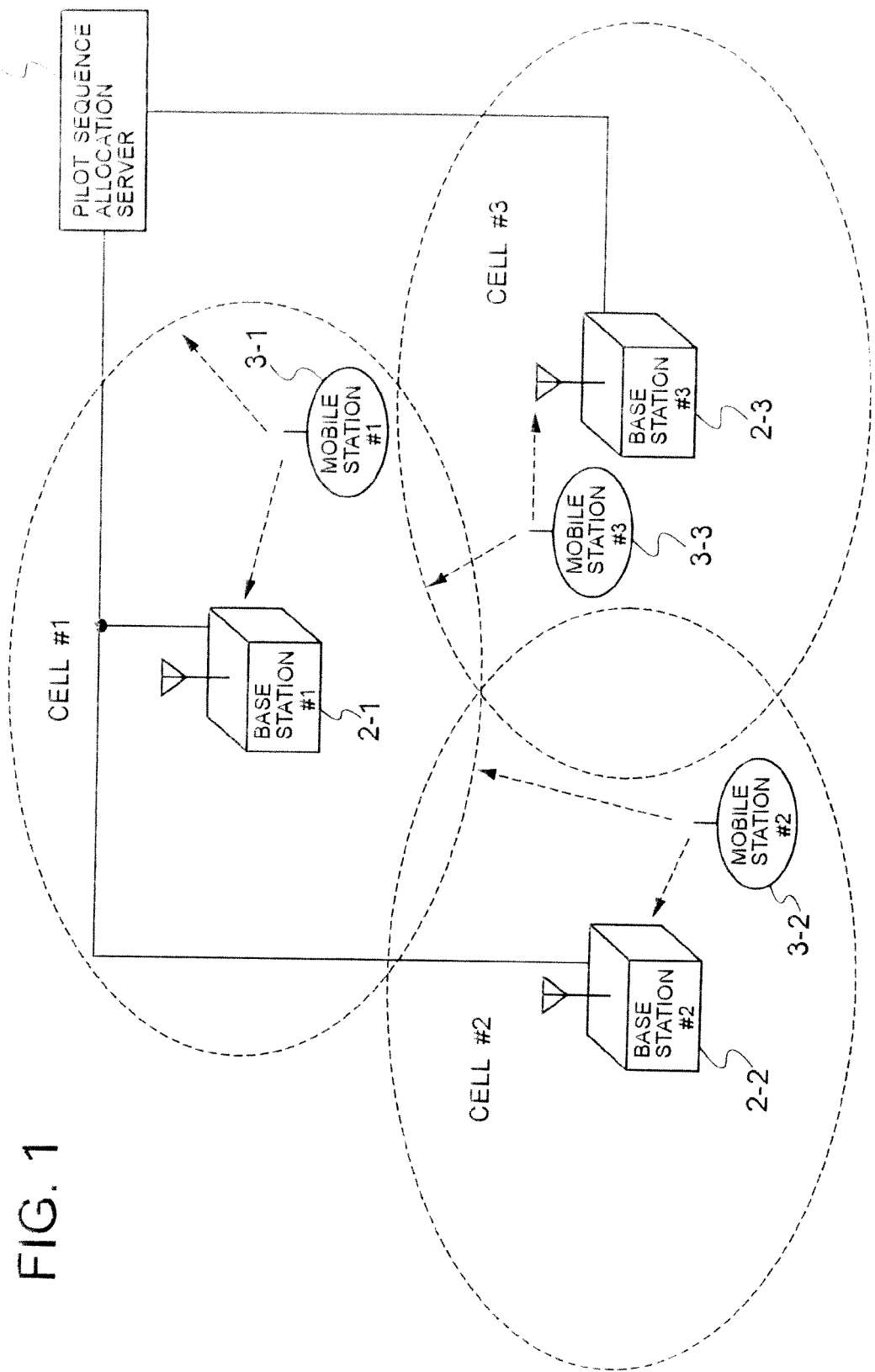
FIG. 1 is a block diagram showing a configuration of wireless communication system by the first embodiment of the present invention.

FIG. 1 is a block diagram showing a configuration of wireless communication system by the first embodiment of the present invention. In FIG. 1, the wireless communication system by the first embodiment of the present invention includes a pilot sequence allocation server 1, base stations (#1 to #3) 2-1 to 2-3, and mobile stations (#1 to #3) 3-1 to 3-3.

At cells #1 to #3 managed by each of the base stations (#1 to #3) 2-1 to 2-3, a signal of the pilot sequence allocated in a method to be described below is sent as communication between the base stations (#1 to #3) 2-1 to 2-3 and the mobile stations (#1 to #3) 3-1 to 3-3. Here, the communication from the mobile stations (#1 to #3) 3-1 to 3-3 to the base stations (#1 to #3) 2-1 to 2-3 is called uplink communication and communication from the base stations to the mobile stations (#1 to #3) 3-1 to 3-3 is called downlink communication.

A general wireless communication network with a service area divided into a plurality of cells #1 to #3 is supposed as a wireless communication system by the first embodiment of the present invention. The plurality of base stations (#1 to #3) 2-1 to 2-3 are combined together and connected to the pilot sequence allocation server 1. The pilot sequence allocation server 1 needs not to be present independent of the base stations (#1 to #3) 2-1 to 2-3 and may be provided in any of the plurality of base stations (#1 to #3) 2-1 to 2-3. Further, the pilot sequence allocation server 1 may be provided in the higher-level device of the plurality of base stations (#1 to #3) 2-1 to 2-3 (for example, a base station controlling device or a core network) (not shown).

Figure 2:
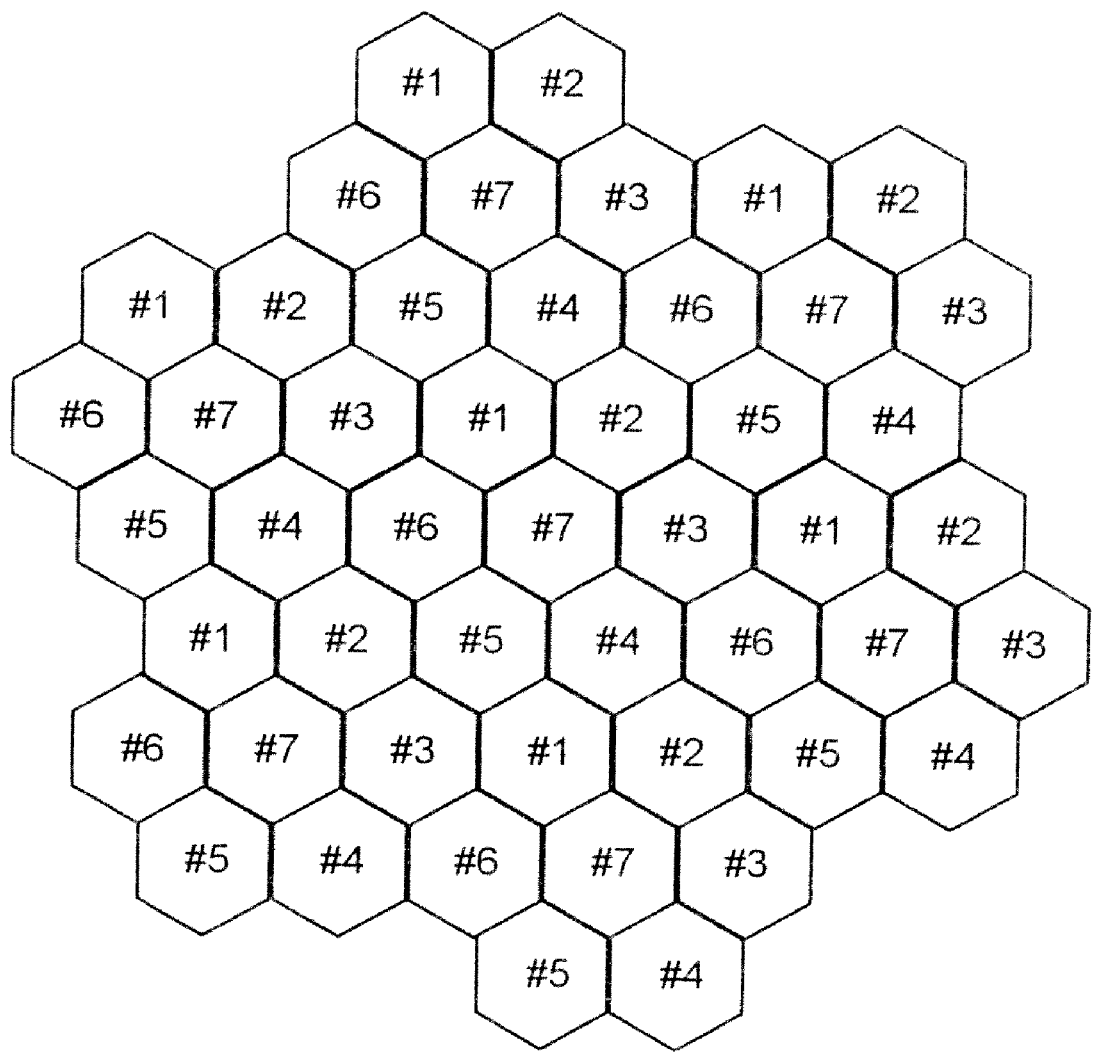
FIG. 2 is a diagram showing a cell arrangement pattern used in the first embodiment of the present invention.

FIG. 2 is a diagram showing a cell arrangement pattern used in the first embodiment of the present invention. FIG. 2 shows a seven cell repeating pattern by seven base stations from #1 to #7. The pilot sequence allocation server 1 allocates any of the seven indices from #1 to #7 shown in FIG. 2 to each of the connected base stations. Based on the indices, the pilot sequence allocation server 1 performs pilot sequence allocation to be described later for each of the seven base stations thereunder.

Figure 19:
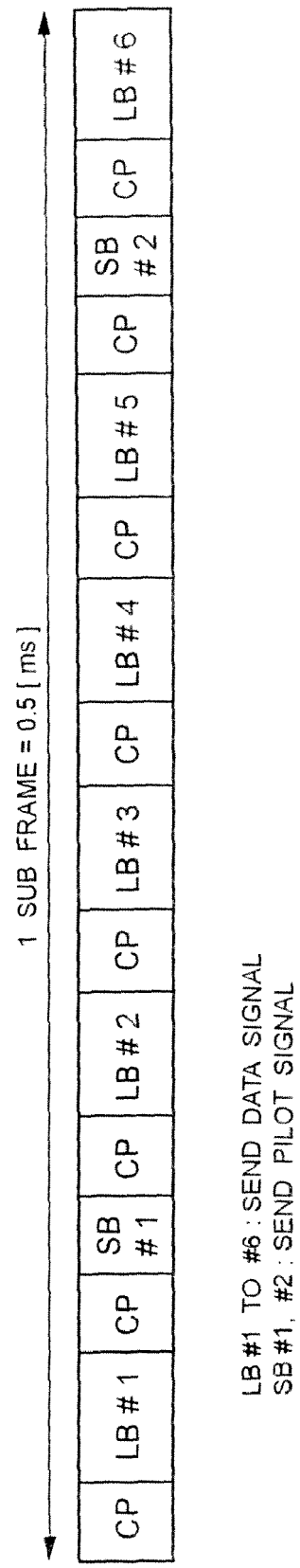
FIG. 19 is a diagram showing an example of a configuration of a frame format used in the single carrier transmission method.

A frame format to be used for sending communication data and a pilot signal between the base stations (#1 to #3) 2-1 to 2-3 and the mobile stations (#1 to #3) 3-1 to 3-3 has a configuration as shown in FIG. 19. It is considered that a data signal is sent in six LBs (Long Block) #1 to #6 by one sub-frame, and a pilot signal is sent in two SB (Short Block) #1, #2.

That is to say, in the embodiment, it is assumed that the number of pilot blocks in one frame is two, the cell repetition factor in a pilot sequence is seven, and the pilot sequence used for sending is the Zadoff-Chu sequence represented by the formula (1), and the number of sequences used is seven, the same number as the cell repetition factor. The sequence is assumed as $\{C\_1, C\_2, C\_3, C\_4, C\_5, C\_6, C\_7\}$.

Further, the pilot sequence allocation server 1 is assumed to previously store the cell repeating pattern of the base station (#1 to #3) 2-1 to 2-3 each of which is connected to the server 1 (This means a cell arrangement pattern in which the same pilot patterns are not adjacent to each other. In the embodiment, it is assumed the seven cell repeating pattern as shown in FIG. 2).

Figure 3:
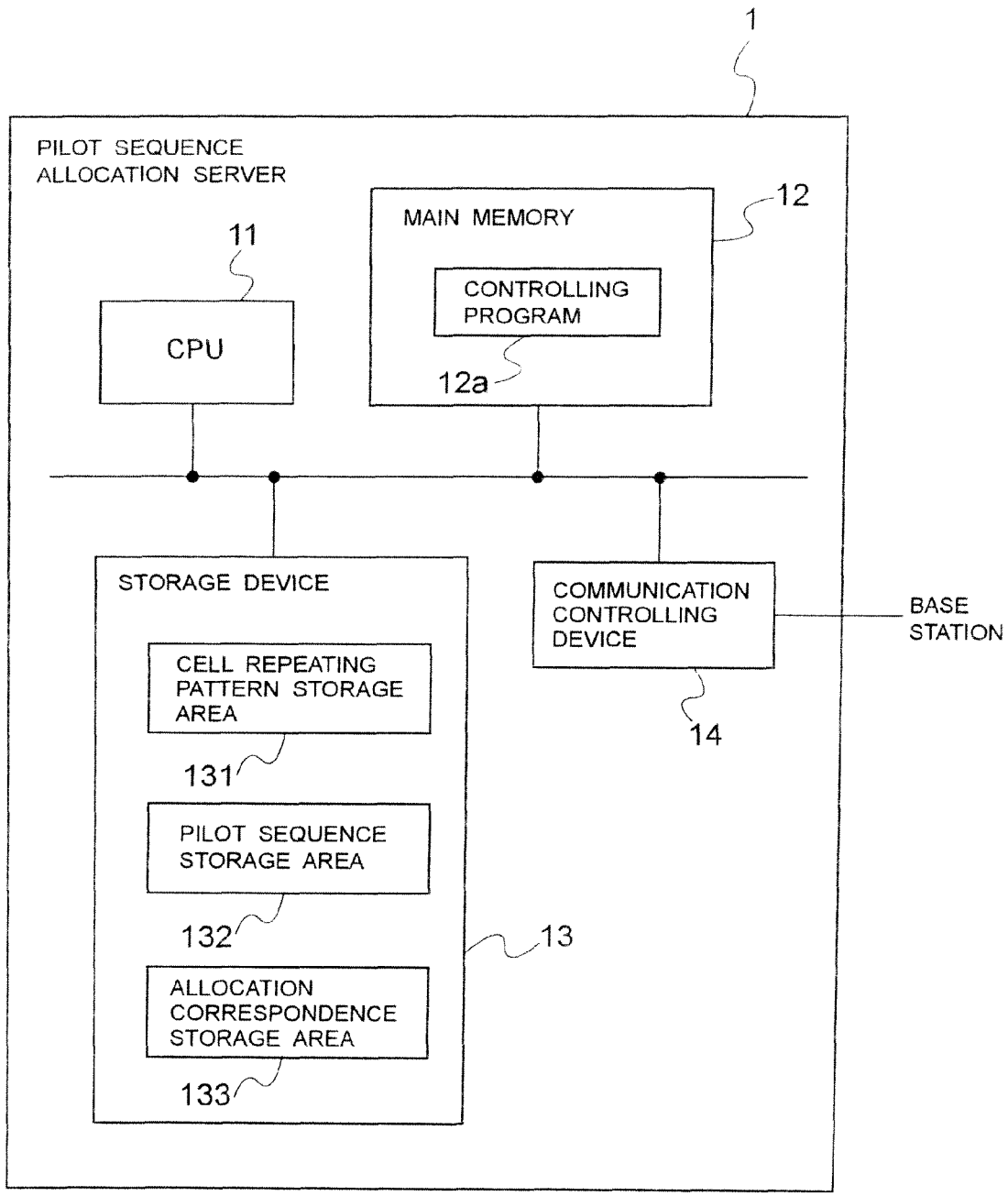
FIG. 3 is a block diagram showing an example of a configuration the pilot sequence allocation server of FIG. 1.

FIG. 3 is a block diagram showing an example of a configuration of the pilot sequence allocation server 1 of FIG. 1. In FIG. 3, the pilot sequence allocation server 1 includes a CPU (central processing unit) 11, a main memory 12 for storing a controlling program 12a executed by the CPU 11, a storage device 13 for storing data and the like used when the CPU 11 executes the controlling program 12a and a communication controlling device 14 for controlling communication with each of the base stations (#1 to #3) 2-1 to 2-3.

The storage device 13 includes a cell repeating pattern storage area 131 for storing the above-mentioned cell repeating pattern, a pilot sequence storage area 132 for storing a pilot sequence, and an allocation correspondence storage area 133 storing an allocation correspondence table showing correspondence between each of the base stations (cell #1 to #K) and the pilot sequence to be allocated to the base station.

Figure 4:
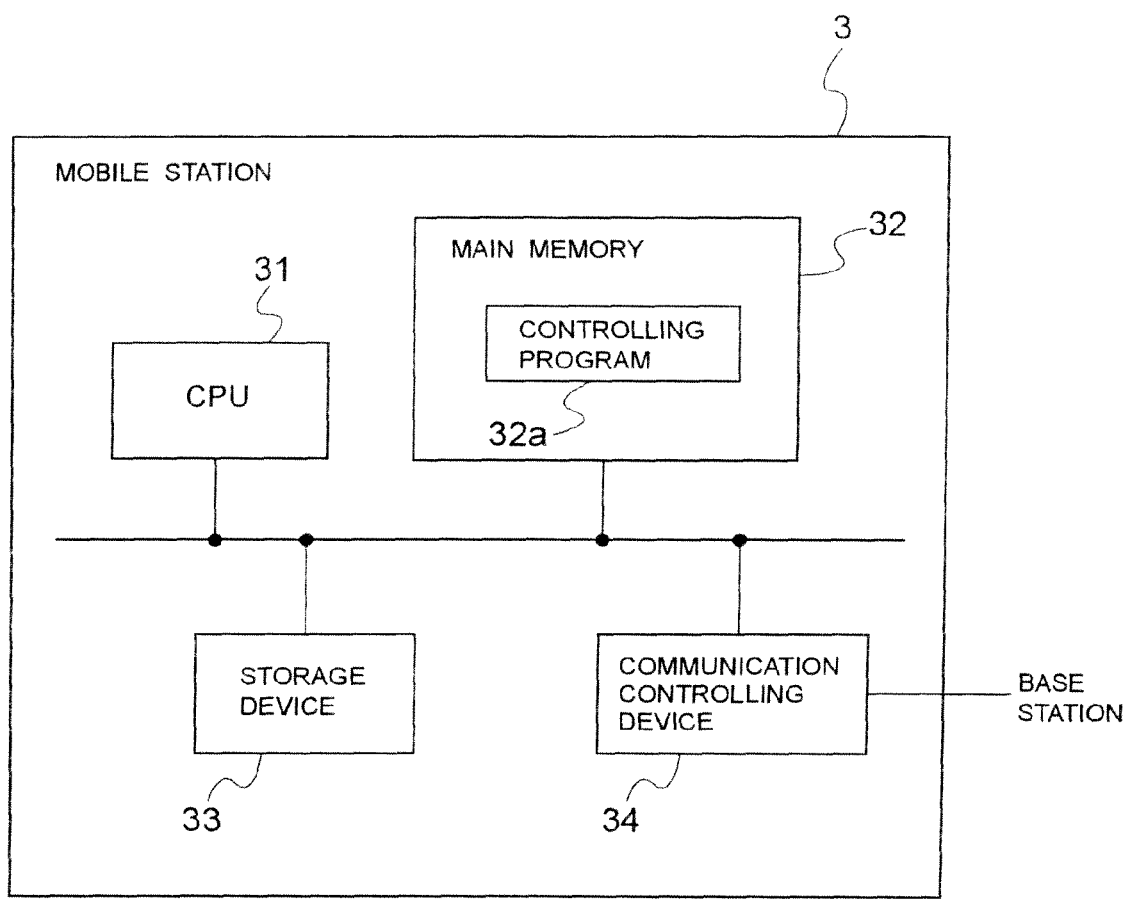
FIG. 4 is a diagram showing an example of configuration of the mobile stations of FIG. 1.

FIG. 4 is a block diagram showing an example of a configuration of the mobile stations (#1 to #3) 3-1 to 3-3 of FIG. 1. In FIG. 4, the mobile stations 3 includes a CPU 31, a main memory 32 for storing a controlling program 32a executed by the CPU 31, a storage device 33 for storing data and the like used when the CPU 31 executes the controlling program 32a, and a communication controlling device 34 for controlling communication with each of the base stations (#1 to #3) 2-1 to 2-3. The mobile stations (#1 to #3) 3-1 to 3-3 have the same configuration as that of the mobile station.

Figure 6:
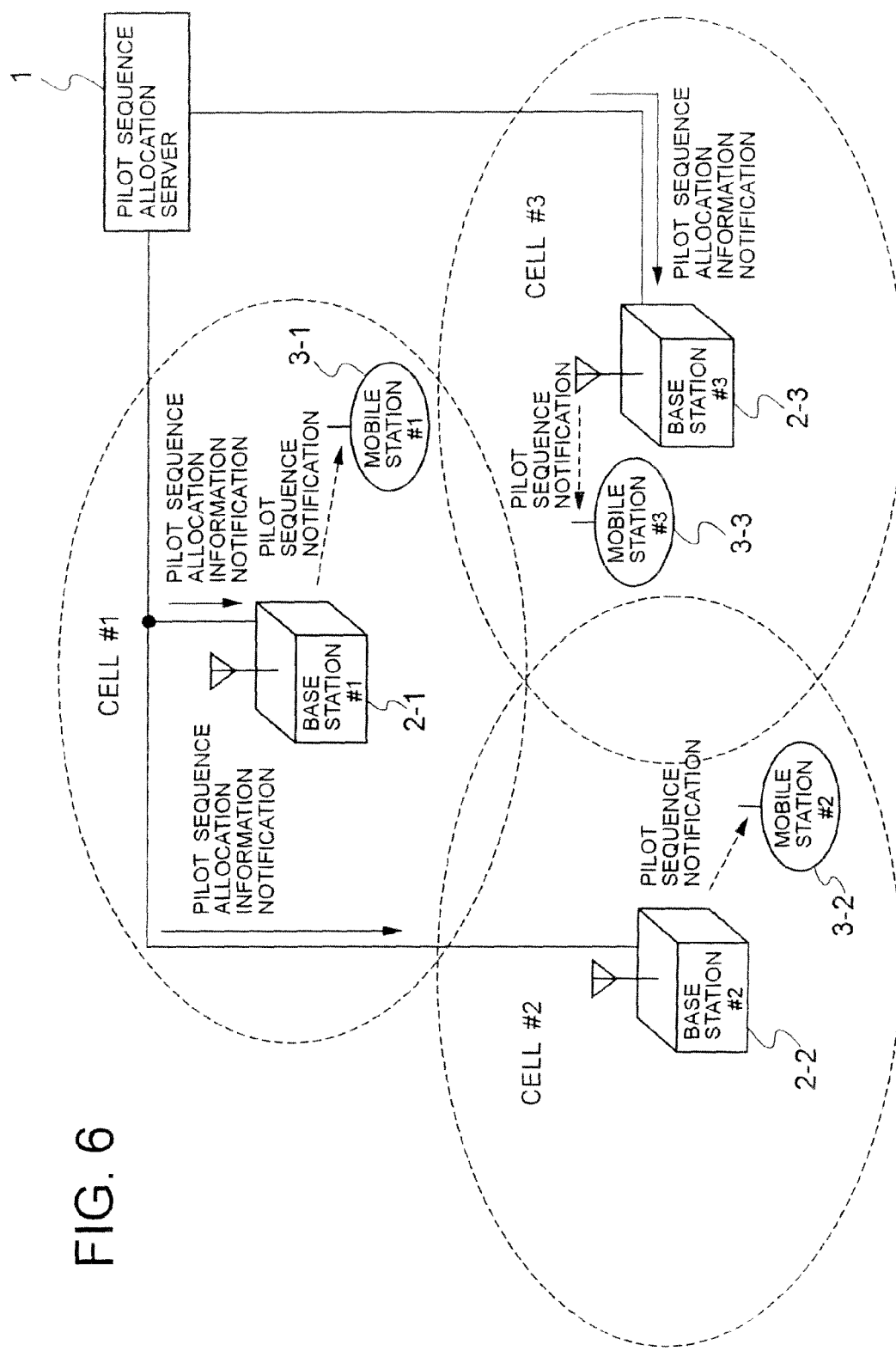
FIG. 6 is a diagram showing notification of a pilot sequence in the wireless communication system by the first embodiment of the present invention.
Figure 7:
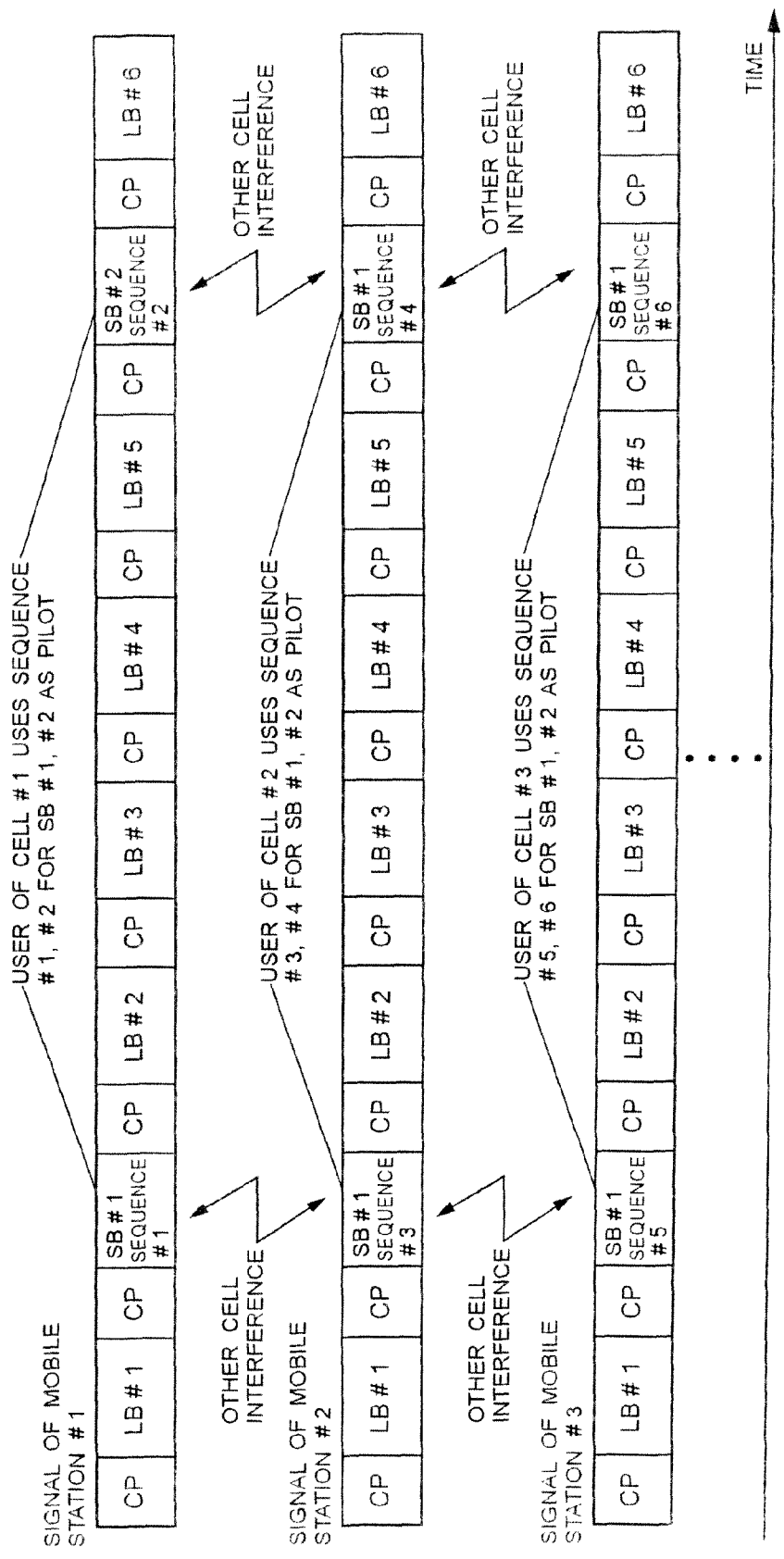
FIG. 7 is a diagram for illustrating effect of the pilot sequence allocation in the wireless communication system by the first embodiment of the present invention.

FIG. 5 is a diagram showing an allocation correspondence table showing pilot sequence allocation by the first embodiment of the present invention. FIG. 6 is a diagram showing notification of a pilot sequence in the wireless communication system by the first embodiment of the present invention. FIG. 7 is a diagram for illustrating effect of the pilot sequence allocation in the wireless communication system by the first embodiment of the present invention. Referencing to FIGS. 1 to 7, operations of the pilot sequence allocation in the wireless communication system by the first embodiment of the present invention will be described.

The wireless communication system by the first embodiment of the present invention adopts a pilot sequence allocation method of dividing the pilot sequences by the number of 2K into K sets like $\{[C\_1, C\_2], [C\_3, C\_4], \ldots, [C\_(2K-1), C\_2K]\}$ and allocating a set of the pilot sequences to each of the cells #1 to #K (see FIG. 5).

That is to say, in FIG. 5, two pilot sequences: $\{C\_1, C\_2\}$ are allocated to two pilot blocks (SB #1, #2) of the cell #1, two pilot sequences: $\{C\_3, C\_4\}$ are allocated to two pilot blocks (SB #1, #2) of the cell #2, two pilot sequences: $\{C_{13}5, C\_6\}$ are allocated to two pilot blocks (SB #1, #2) of the cell #3, and two pilot sequences $\{C\_7, C\_8\}$ are allocated to two pilot blocks (SB #1, #2) of the cell #4.

Similarly, in FIG. 5, two pilot sequences {C_(2K−3), C_(2K−2)} are allocated to two pilot blocks (SB #1, #2) of the cell #(K−1), and two pilot sequences {C_(2K−1), C_2K} are allocated to two pilot blocks (SB #1, #2) of the cell #K.

As shown in FIG. 5, the pilot sequence allocation server 1 sends pilot sequence allocation information notification to each of the base stations (#1 to #3) 2-1 to 2-3 and allocates a pilot sequence to each of the base stations (#1 to #3) 2-1 to 2-3 based on the set allocation correspondence table. Each of the base stations (#1 to #3) 2-1 to 2-3 notifies the mobile stations (#1 to #3) 3-1 to 3-3 by sending downlink notification channel including an index of the allocated pilot sequence or the like to a service area in the cells #1 to #3 [pilot sequence notification to mobile station (#1 to #3) 3-1 to 3-3] (see FIG. 6).

Each of the mobile stations (#1 to #3) 3-1 to 3-3 in the service area obtains an index of two pilot blocks (SB #1, #2) used in the cells (#1 to #3) in which the self-station is present by receiving a downlink notification channel or the like. Each of the mobile stations (#1 to #3) 3-1 to 3-3 sends different pilot sequences for SB #1 and #2 based on the index of the two pilot blocks obtained from the downlink notification channel or the like, when the mobile station sends data to each of the base stations (#1 to #3) 2-1 to 2-3.

At this moment, an interference pattern that SB #1 receives from the mobile station of another cell and an interference pattern that SB #2 receives from the mobile station of another cell are different. That is effective in reducing interference of another cell by combining (averaging) SB #1 and #2 in allocating a pilot sequence in the embodiment (see FIG. 7).

As such, in the embodiment, different pilot sequences can be sent in different pilot blocks in a frame (SB #1, #2) so that significant effect such as a plurality of receiving pilot blocks are combined (averaged) together at the receiving side to reduce an interference of another cell can be obtained.

As mentioned above, as this embodiment is changed to allocate two sequences instead of a sequence to a cell in, the reused cell repetition factor of the pilot sequence is reduced. Each of the embodiments to be described later devised on that point and also improves in that the amount interference from a cell using the same code increases as a distance between the base stations using the same pilot sequences decreases. Although a method for allocating an uplink pilot sequence to each cell has been described in the embodiment, the similar pilot sequence allocation method can be applied to the method for allocating the downlink pilot sequence to each cell.

[Embodiment 2]

Figure 8:
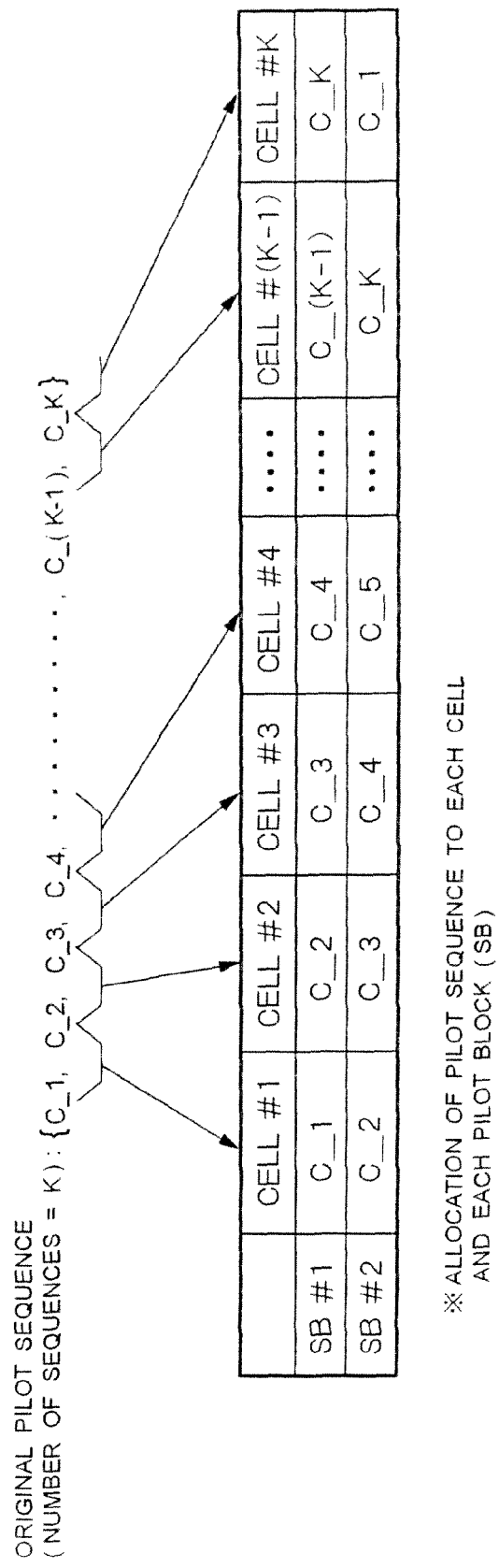
FIG. 8 is a diagram showing a configuration of an allocation correspondence table showing an allocation of pilot sequence by the second embodiment of the present invention.
Figure 9:
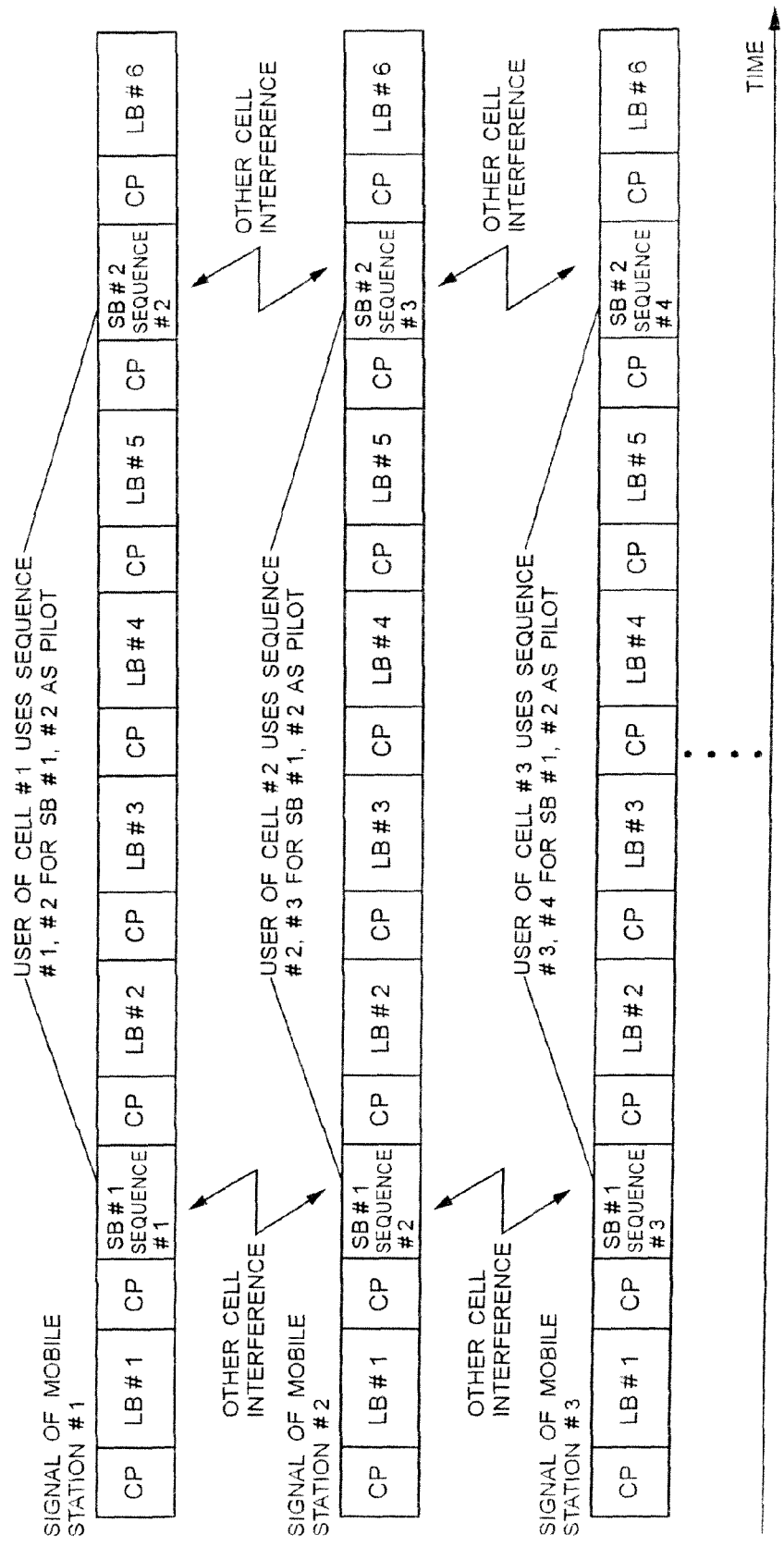
FIG. 9 is a diagram for illustrating effect of allocation of a pilot sequence in the wireless communication system by the second embodiment of the present invention.

FIG. 8 is a diagram showing an allocation correspondence table showing an allocation of pilot sequence by the second embodiment of the present invention. FIG. 9 is a diagram for illustrating effect of allocation of a pilot sequence in the wireless communication system by the second embodiment of the present invention.

The wireless communication system by the second embodiment of the present invention has the same configuration as that of the wireless communication system by the first embodiment of the present invention shown in FIG. 1 except for a method for allocating a pilot sequence. The pilot sequence allocation server by the second embodiment of the present invention also has the same configuration as that of the pilot sequence allocation server 1 by the first embodiment of the present invention shown in FIG. 3. Further, the mobile station by the second embodiment of the present invention also has the same configuration as that of the mobile station 3 by first embodiment of the present invention shown in FIG. 4. The cell arrangement pattern used in the second embodiment of the present invention also has the same cell arrangement pattern used in the first embodiment of the present invention shown in FIG. 2.

The pilot sequence allocation server 1 allocates one of the seven indices from #1 to #7 shown in FIG. 2 to each of the connected base stations (#1 to #3) 2-1 to 2-3. Based on the indices, the pilot sequence allocation server 1 allocates a pilot sequence for each of the seven base stations thereunder.

FIG. 8 shows an allocation correspondence table for allocating two pilot sequences: {C_K, C_(K+1)} (K=1, 2, ..., 6) to each of the cells of the indices #K (K=1, 2, ..., 7). In the case of K=7, {C_7, C_1} is allocated. The pilot sequence allocation server 1 sends pilot sequence allocation information notification to each of the base stations (#1 to #3) 2-1 to 2-3 and allocates a pilot sequence to each of the base stations (#1 to #3) 2-1 to 2-3 based on the allocation correspondence table set as shown in FIG. 8.

Each of the base stations (#1 to #3) 2-1 to 2-3 notices the mobile stations (#1 to #3) 3-1 to 3-3 by sending a downlink notification channel or the like including an index of the allocated pilot sequences to the service area of the self-station [pilot sequence notification to mobile stations (#1 to #3) 3-1 to 3-3]. The mobile stations (#1 to #3) 3-1 to 3-3 in the service area obtain an index of two pilot blocks (SB #1, #2) used in a cell in which the self-station is present by receiving the downlink notification channel or the like. Then, the mobile stations (#1 to #3) 3-1 to 3-3 sends pilot sequences that are different for SB #1 and #2 as shown in FIG. 9 based on the index of two pilot blocks obtained from the downlink notification channels and the like when it sends data to the base stations (#1 to #3) 2-1 to 2-3.

That is to say, in FIG. 8, two pilot sequences: {C_1, C_2} are allocated to two pilot blocks (SB #1, #2) of the cell #1, two pilot sequences: {C_2, C_3} are allocated to two pilot blocks (SB #1, #2) of the cell #2, two pilot sequences: {C_3, C_4} are allocated to two pilot blocks (SB #1, #2) of the cell #3, and two pilot sequences {C_4, C_5} are allocated to two pilot blocks (SB #1, #2) of the cell #4.

Similarly, in FIG. 8, two pilot sequences {C_(K−1), C_K} are allocated to two pilot blocks (SB #1, #2) of the cell #(K−1), and two pilot sequences (C_K, C_1) are allocated to two pilot blocks (SB #1, #2) of the cell #K.

As such, in the embodiment, different pilot sequences can be sent in different pilot blocks (SB #1, #2) in a frame without decreasing the cell repetition factor for reusing a pilot sequence by allocating the pilot sequence allocated to SB #2 of a certain base station (cell) to SB #1 of the other base station (cell) again. From that, significant effect in reducing interference of another cell can be realized without decreasing the cell repetition factor for reusing pilot sequences by combining (averaging) a plurality of pilot blocks at the receiving side in the embodiment.

[Embodiment 3]

Figure 10:
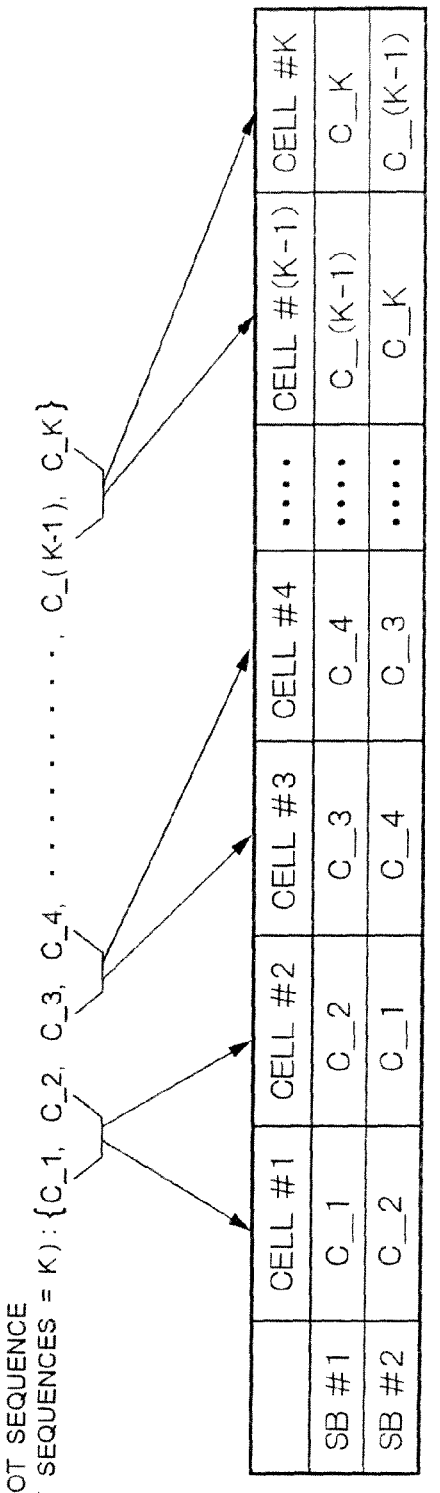
FIG. 10 is a diagram showing a configuration of an allocation correspondence table showing allocation of pilot sequence by the third embodiment of the present invention.

FIG. 10 is a diagram showing an allocation correspondence table showing allocation of pilot sequence by the third embodiment of the present invention. The wireless communication system by the third embodiment of the present invention has the same configuration as that of the wireless communication system by the first embodiment of the present invention shown in FIG. 1 except for a method for allocating a pilot sequence. The pilot sequence allocation server by the third embodiment of the present invention also has the same configuration as that of the pilot sequence allocation server 1 by the first embodiment of the present invention shown in FIG. 3. Further, the mobile station by the third embodiment of the present invention also has the same configuration as that of the mobile station 3 by the first embodiment of the present invention shown in FIG. 4. The cell arrangement pattern used in the third embodiment of the present invention also has the same cell arrangement pattern used in the first embodiment of present invention as shown in FIG. 2.

The pilot sequence allocation server 1 allocates one of the seven indices from #1 to #7 shown in FIG. 2 to each of the connected base stations (#1 to #3) 2-1 to 2-3. Based on the indices, the pilot sequence allocation server 1 allocates a pilot sequence for each of the seven base stations thereunder.

FIG. 10 shows an allocation correspondence table for dividing cells by the number of K for performing pilot allocation into some regions (groups) and allocating a set of pilot sequences for each of the divided regions. The pilot sequence allocation server 1 sends pilot sequence allocation information notification to each of the base stations (#1 to #3) 2-1 to 2-3 and allocates a pilot sequence to each of the base stations (#1 to #3) 2-1 to 2-3 based on the allocation correspondence table set as shown in FIG. 10.

Each of the base stations (#1 to #3) 2-1 to 2-3 notices the mobile stations (#1 to #3) 3-1 to 3-3 by sending a downlink notification channel or the like including an index of the allocated pilot sequences to the service area of the self-station [pilot sequence notification to mobile stations (#1 to #3) 3-1 to 3-3]. The mobile stations (#1 to #3) 3-1 to 3-3 in the service area obtain an index of two pilot blocks (SB #1, #2) used in a cell in which the self-station is present by receiving the downlink notification channel or the like. Then, the mobile stations (#1 to #3) 3-1 to 3-3 sends pilot sequences that are different for SB #1 and #2 based on the index of two pilot blocks obtained from the downlink notification channels and the like when it sends data to the base stations (#1 to #3) 2-1 to 2-3.

That is to say, in FIG. 10, the cell #1 and the cell #2 belong to the first divided region, and two pilot sequences: {C_1, C_2} are allocated to two cells #1 and #2. Two pilot sequences: {C_1, C_2} are allocated to two pilot blocks (SB #1, #2) of the cell #1 in the order of C_1, C_2. On the other hand, two pilot sequences: {C_1, C_2} are allocated to two pilot blocks (SB #1, #2) of the cell #2 in the order of C_2, C_1.

The cell #3 and the cell #4 belong to the second divided region, and two pilot sequences: {C_3, C_4} are allocated to two cells #3 and #4. Two pilot sequences: {C_3, C_4} are allocated to two pilot blocks (SB #1, #2) of the cell #3 in the order of C_3, C_4. On the other hand, two pilot sequences: {C_3, C_4} are allocated to two pilot blocks (SB #1, #2) of the cell #4 in the order of C_4, C_3.

Similarly, the cell #(K−1) and the cell #K belong to the K/2 divided region, with two pilot sequence {C_(K−1), C_K} being allocated to two cells #(K−1) and the cell #K. Two pilot sequence: {C_(K−1), C_K} are allocated to two pilot blocks (SB #1, #2) of the cell #(K−1) in the order of C_(K−1) and C_K. On the other hand, two pilot sequences {C_(K−1), C_K} are allocated to two pilot blocks (SB #1, #2) of the cell #K in the order of C_K, C_(K−1).

As such, in the embodiment, different pilot sequences can be sent in different pilot blocks in a frame (SB #1, #2) without decreasing the cell repetition factor for reusing a pilot sequences by allocating the pilot sequence allocated to SB #1 and SB #2 of a certain base station to each of SB #2 and SB #1 of the other base station again. With that, in the embodiment, significant effect in reducing interference of another cell can be achieved without reducing the cell repetition factor for reusing a pilot sequence by combining (averaging) a plurality of received pilot blocks at the receiving side.

[Embodiment 4]

FIG. 11 is a diagram showing an allocation correspondence table showing allocation of pilot sequence by the fourth embodiment of the present invention. The wireless communication system by the fourth embodiment of the present invention has the same configuration as that of the wireless communication system in the first embodiment of the present invention shown in FIG. 1 except for the number of pilot blocks in frame. The pilot sequence allocation server by the fourth embodiment of the present invention has the same configuration as that of the pilot sequence allocation server 1 by the first embodiment of the present invention shown in FIG. 3. Further, the mobile station by the fourth embodiment of the present invention has the same configuration as that of the mobile station 3 by the first embodiment of the present invention shown in FIG. 4. The cell arrangement pattern used in the fourth embodiment of the present invention has the same cell arrangement pattern used in the first embodiment of the present invention shown in FIG. 2. Further, a method for allocating a pilot sequence by the fourth embodiment of the present invention is the same method for allocating a pilot sequence by the second embodiment of the present invention shown in FIG. 8.

That is to say, in FIG. 11, three pilot sequences: {C_1, C_2, C_3} are allocated to three pilot blocks (SB #1, #2, #3) of the cell #1, and three pilot sequences: {C_2, C_3, C_4} are allocated to three pilot blocks (SB #1, #2, #3) of the cell #2.

In FIG. 11, three pilot sequences: {C_3, C_4, C_5} are allocated to three pilot blocks (SB #1, #2, #3) of the cell #3, and three pilot sequences {C_4, C_5, C_6} are allocated to three pilot blocks (SB #1, #2, #3) of the cell #4.

Similarly, in FIG. 11, three pilot sequences {C_(K−1), C_K, C_1} are allocated to three pilot blocks (SB #1, #2, #3) of the cell #(K−1), and three pilot sequences {C_K, C_1, C_2} are allocated to three pilot blocks (SB #1, #2, #3) of the cell #K.

As such, in the embodiment, different pilot sequences can be sent in different pilot blocks (SB #1, #2, #3) in a frame without decreasing the cell repetition factor for reusing a pilot sequence by allocating the pilot sequence allocated to SE #2 and SB #3 of a certain base station to SB #1 and SB #2 of the other base station again. From that, in the embodiment significant effect in reducing interference of another cell can be realized without decreasing the cell repetition factor for reusing pilot sequences by combining (averaging) a plurality of received pilot blocks at the receiving side in the embodiment.

[Embodiment 5]

Figure 12:
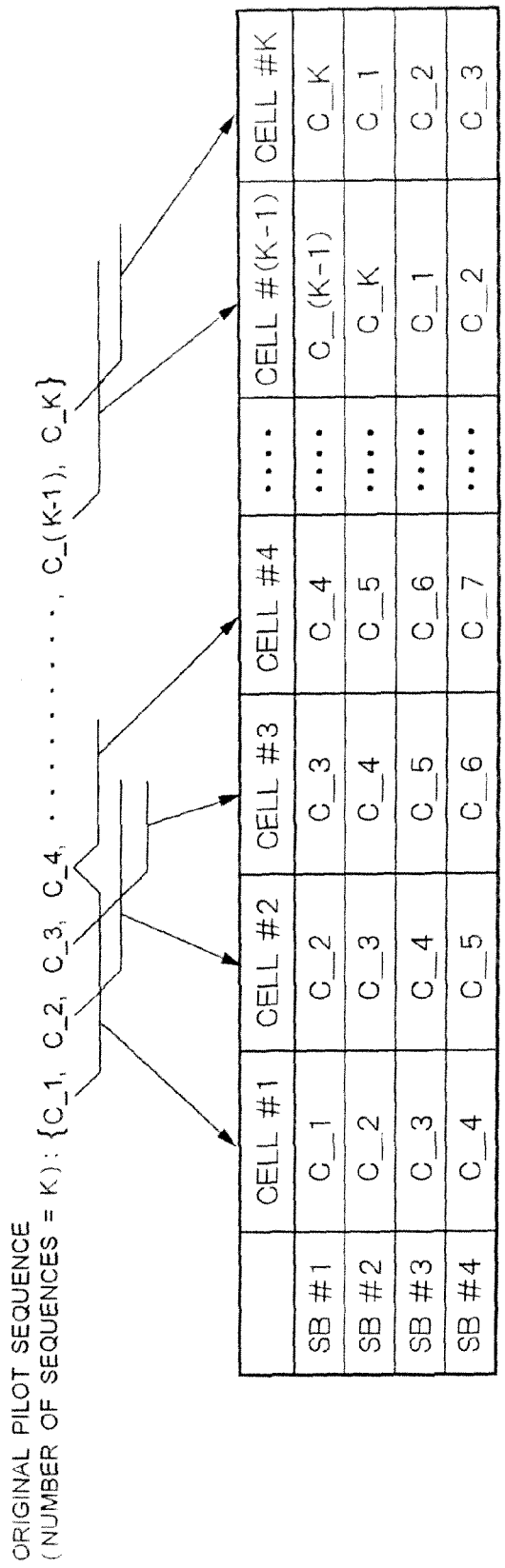
FIG. 12 is a diagram showing a configuration of an allocation correspondence table showing allocation of pilot sequences by the fifth embodiment of the present invention.

FIG. 12 is a diagram showing an allocation correspondence table showing allocation of pilot sequences by the fifth embodiment of the present invention. The wireless communication system by the fifth embodiment of the present invention has the same configuration as that of the wireless communication system by the first embodiment of the present invention shown in FIG. 1 except for the number of pilot blocks in a frame. The pilot sequence allocation server by the fifth embodiment of the present invention also has the same configuration as that of the pilot sequence allocation server 1 by the first embodiment of the present invention shown in FIG. 3. Further, the mobile station by the fifth embodiment of the present invention also has the same configuration as that of the mobile station 3 by the first embodiment the present invention shown in FIG. 4. The cell arrangement pattern used in the fifth embodiment of the present invention also has the same cell arrangement pattern used in the first embodiment of the present invention as shown in FIG. 2. Further, a method for allocating a pilot sequence by the fifth embodiment of the present invention is the same method for allocating a pilot sequence by the second embodiment of the present invention as shown in FIG. 8.

That is to say, in FIG. 12, four pilot sequences: {C_1, C_2, C_3, C_4} are allocated to four pilot blocks (SB #1, #2, #3,

4) of the cell #1, and four pilot sequences: {C_2, C_3, C_4, C_5} are allocated to four pilot blocks (SB #1, #2, #3, #4) of the cell #2.

In FIG. 12, four pilot sequences: {C_3, C_4, C_5, C_6} are allocated to four pilot blocks (SB #1, #2, #3, #4) of the cell #3, and four pilot sequences: {C_S, 5_6, C_7} are allocated to four pilot blocks (SB #1, #2, #3, #4) of the cell #4.

Similarly, in FIG. 12, four pilot sequences: {C_(K−1), C_K, C_1, C_2} are allocated to four pilot blocks SB #1, #2, #3, #4) of the cell #(K−1), and four pilot sequences: {C_K, C_1, C_2, C_3} are allocated to four pilot blocks (SB #1, #2, #3, #4) of he cell #K.

As such, in the embodiment, different pilot sequences can be sent in different pilot blocks in a frame (SB #1, #2, #3, #4) without decreasing the cell repetition factor for reusing pilot sequences by allocating the pilot sequence allocated to SB #2, SB #3 and SB #4 of a certain base station to SB #1, SB #2 and SB #3 of another base station again. From that, a significant effect in reducing interference of another cell without decreasing the cell repetition factor for reusing a pilot sequence by combining (averaging) a plurality of received pilot blocks at the receiving side in the embodiment.

Figure 13:
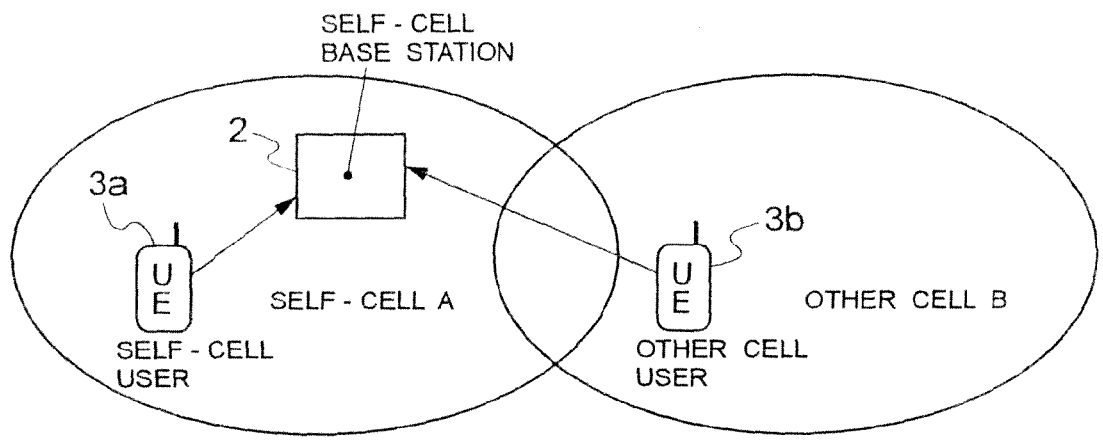
FIG. 13 is a block diagram showing a system model of a simulation relating to the present invention.
Figure 14:
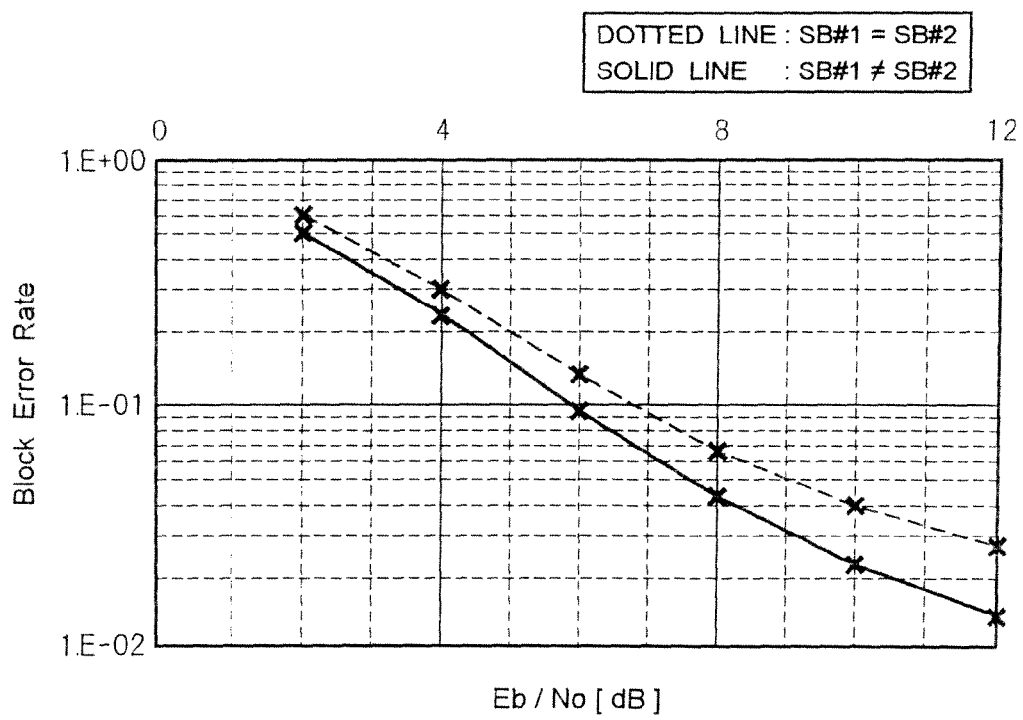
FIG. 14 is a diagram showing a simulation result in the present invention.

FIG. 13 is a block diagram showing a system model of a simulation relating to the present invention. FIG. 14 is a diagram showing a simulation result relating to the present invention. FIGS. 15A to 15C and 16A to 16C are diagrams showing exemplary allocation of pilot sequences to a pilot blocks (SB #1, SB #2) used in a simulation relating to the present invention. FIG. 17 is a diagram showing exemplary parameters used in a simulation relating to the present invention. FIG. 18 is a diagram showing a case where a data signal and a pilot signal are multiplexed in a frequency region of a simulation relating to the present invention. Effects of the present invention will be described with reference to FIGS. 13 to 18.

As shown in FIG. 13, the wireless communication system of a simulation relating the present invention includes two cells of a self-cell A and other cell B. The self-cell A has a self-cell base station 2 and the self-cell user [mobile station (UE) 3a]. The other cell B has the other cell user [mobile station (UE) 3b]. The self-cell base station receives a signal from the self-cell user [mobile station (UE) 3a], and also receives a signal from the other cell user [mobile station (UE) 3b] as interference. Further, in the simulation relating to the present invention, a frame of communication between a base station and a mobile station is assumed to have two pilot blocks SB #1 and SB #2.

FIG. 14 shows block error rate characteristics of a signal that the self-cell base station 2 receives from the self-cell user [mobile station (UE) 3a]. The dotted line shows a result of the case where the same pilot sequence is used in SB #1 and SB #2 [FIG. 15A table #1]. The solid line shows a result of the case where different pilot sequences are used for SB #1 and SB #2 [FIG. 15B table #2].

The simulation relating to the present invention uses Localized FDM for data multiplexing method, and Distributed-FDM pilot [1] (9. 1. 1. 2. 2 Uplink reference-signal structure) for a pilot multiplexing method. It is set SRF (Symbol Repetition Factor) of the pilot=4. Further, an interference user from another cell et to a user, and the average interference power is set to −6 dB for the average power of the self-cell user, and a frame timing between the self-cell user and the other cell user (interference user) is assumed to be synchronized with.

Further, the pilot sequence uses a sequence described in the abovementioned formula (1) ("k" in the formula is a parameter), the pilot sequence allocation to each user and each SB (allocation of parameter "k") is shown in each of the tables #1 to #6 in FIG. 15A to 15C and FIG. 16A to 16C. For reference, the case of multiplexing data and pilot in a frequency region at this moment is shown in FIG. 18 and parameters used in the simulation are shown in FIG. 17.

As shown in FIG. 14, it is apparent that Eb/No required for meeting the block error rate=$10^{-1}$ is improved by near 1 dB. It is apparent that Eb/No required for meeting the block error rate=$3 \times 10^{-2}$ is improved by 2 dB or more.

It is assumed that the table #2 shown in FIG. 15B shows the abovementioned pilot allocation of the second embodiment of the present invention but the pilot allocation of the third embodiment of the present invention, i.e., allocation in the table #3 shown in FIG. 15C may achieve the same effects. For the pilot allocation of the first embodiment of the present invention [pilot sequence allocation such as the table #4 shown in FIG. 16A], the same effects may be achieved.

As the tables #5 and #6 shown in FIG. 16B, 16C, an effect of reducing the other cell interference can be achieved even if the pilot sequence used in SB #1 is the same as that in the other cell, if the sequence used in SB #2 is different. Similarly, the same effect as that mentioned above can be achieved even if SB #2 uses the same sequence as the adjacent cell, if a sequence different from that of the adjacent cell is used in SB #1. That is to say, if at least one of the pilot sequences allocated to the self-cell is different from at least one of the pilot sequence allocated to the other cell, the same effect can be achieved. This is true in the case where the number of SBs in a frame is three or more.

In the present invention, the cases where the number of pilot blocks in a frame is two or four have been respectively described above. The present invention, however, can be applied to the cases where the number of pilot blocks is five or more as to the cases where the number of blocks is two or four.

What is claimed is:

1. A mobile station in a wireless communication system including a base station, the mobile station comprising:
 a unit that sends a pilot signal to the base station,
 wherein a sub-frame used for sending the pilot signal includes a first pilot block and a second pilot block, and
 wherein a first Zadoff-Chu sequence allocated to the first pilot block is different from a second Zadoff-Chu sequence allocated to the second pilot block.

2. A method for a mobile station in a wireless communication system including a base station, the method comprising:
 communicating with the base station; and
 sending a pilot signal to the base station,
 wherein a sub-frame used for sending the pilot signal includes a first pilot block and a second pilot block, and
 wherein a first Zadoff-Chu sequence allocated to the first pilot block is different from a second Zadoff-Chu sequence allocated to the second pilot Block.

* * * * *